United States Patent
Sowada et al.

(10) Patent No.: US 6,398,184 B1
(45) Date of Patent: Jun. 4, 2002

(54) LOCK DEVICE AND LOCK METHOD FOR KNIFE GATE VALVES

(75) Inventors: Craig A. Sowada, Holdingford; Richard R. Ruegemer, St. Cloud, both of MN (US)

(73) Assignee: General Signal Corporation, Muskegon, MI (US)

( * ) Notice: Subject to any disclaimer, the term of this patent is extended or adjusted under 35 U.S.C. 154(b) by 0 days.

(21) Appl. No.: 09/750,271

(22) Filed: Dec. 29, 2000

(51) Int. Cl.[7] .................. F16K 35/00; F16K 31/44; F16K 51/00; F16K 3/00
(52) U.S. Cl. .................. 251/90; 251/89; 251/77; 251/284; 251/326
(58) Field of Search .................. 251/89, 90, 93, 251/95, 284, 77, 287, 288, 329, 326

(56) References Cited

U.S. PATENT DOCUMENTS

| | | | |
|---|---|---|---|
| 2,679,858 A | * 6/1954 | Kemp | 137/382 |
| 4,328,947 A | * 5/1982 | Reimpell et al. | 251/167 |
| 4,745,944 A | * 5/1988 | Francart, Jr. | 134/166 C |
| 5,394,715 A | 3/1995 | Guerette | 70/177 |
| 5,404,734 A | * 4/1995 | Martinez | 137/285 |
| 5,560,233 A | 10/1996 | Watkins | 70/177 |
| 6,007,047 A | * 12/1999 | Phipps | 251/129.01 |
| 6,044,860 A | 4/2000 | Neu | 137/385 |
| 6,082,393 A | * 7/2000 | Tye | 137/315.27 |
| 6,170,882 B1 | * 1/2001 | Prest | 285/12 |

* cited by examiner

Primary Examiner—Philippe Derakshani
Assistant Examiner—D. Austin Bonderer
(74) Attorney, Agent, or Firm—Baker & Hostetler LLP

(57) ABSTRACT

The present invention provides a device and method for locking a knife gate valve in a position, such as an open and/or closed position. The locking device has a pair of first posts disposed substantially parallel to the shaft. A swivel lock member is mounted to rotate substantially about the axis of the shaft and to reciprocate together with the shaft and the knife. The swivel lock member is selectively rotatable between an unlocked position at which the swivel lock member does not engage the first engageable portions and a locked position at which the swivel lock member engages both of the first engageable portions to prevent the swivel lock member from movement in at least one of the back and forth directions along the axis of the shaft.

20 Claims, 6 Drawing Sheets ns when the swivel lock is in the locked position and engaging the second engageable portions.

LOCK DEVICE AND LOCK METHOD FOR KNIFE GATE VALVES

FIELD OF THE INVENTION

The present invention relates generally to a lock device and lock method for a valve, such as a knife gate valve. More particularly, the invention relates to a lock device and method that can lock the valve in a position such as an open and/or closed position.

BACKGROUND OF THE INVENTION

Various valves are known, including knife gate valves, which may have a knife gate element that reciprocates between open and closed positions. The knife generally moves in a reciprocating linear manner across the area of the fluid channel to form a gate by being actuated by an actuator such as a hydraulic or pneumatic actuator.

There is a need in the art for a simple, convenient, inexpensive device and method to lock the valve in the open and/or closed positions. For example, it may be desired to be able to lock the valve in an open position to avoid problems that might occur should the valve accidentally be activated to close at an improper time, such as during repair. Without a lock, the accidental closing of the valve could cause damage to a partially disassembled valve, or to parts located in the path of travel of the gate of the valve. Also, accidental opening or closing of a valve due to a control failure could damage other machinery associated with the flow system with which the valve is associated.

SUMMARY OF THE INVENTION

The present invention provides a device and method for locking a knife gate valve in a position, such as an open and/or closed position. The invention can provide benefits such as preventing accidental opening or closing of the valve. In one aspect, the invention provides a locking device for a knife gate valve having a housing and a reciprocating shaft that reciprocates a knife in back and forth directions. The locking device has a pair of first posts disposed substantially parallel to the shaft, each first post having one end mounted to the housing, and each first post having a first engageable portion. A swivel lock member is mounted to rotate substantially about the axis of the shaft and to reciprocate together with the shaft and the knife. The swivel lock member is selectively rotatable between (1) an unlocked position at which the swivel lock member does not engage the first engageable portions and (2) a locked position at which the swivel lock member engages both of the first engageable portions to prevent the swivel lock member from movement in at least one of the back and forth directions along the axis of the shaft, thereby preventing the shaft and the knife from reciprocating movement in at least one of the back and forth directions when the swivel lock member is in the locked position and engaging the first engageable portions.

In another aspect, the invention provides a pair of second posts disposed substantially parallel to the shaft, each second post having one end mounted to the housing, and each second post has a second engageable portion. The swivel lock is rotatable to a locked position at which the engaging portions each engage one of the second engageable portions to prevent the swivel lock member from movement in at least one of the back and forth directions along the axis of the shaft, thereby preventing the shaft and the knife from reciprocating movement in one of the back and forth direc- In still another aspect, the invention provides a method for locking a knife gate valve having a housing and a reciprocating shaft that reciprocates a knife in back and forth directions and has a pair of first posts disposed substantially parallel to the shaft, each first post having one end mounted to the housing, and each first post having a first engageable portion comprising the steps of positioning the knife in a desired position. The rotating a swivel lock member is rotated substantially about the axis of the shaft into a locked position at which the swivel lock member engages both of the first engageable portions to prevent the swivel lock member from movement in at least one of the back and forth directions along the axis of the shaft, thereby preventing the shaft and the knife from reciprocating movement in at least one of the back and forth directions when the swivel lock member is in the locked position and engaging the first engageable portions.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
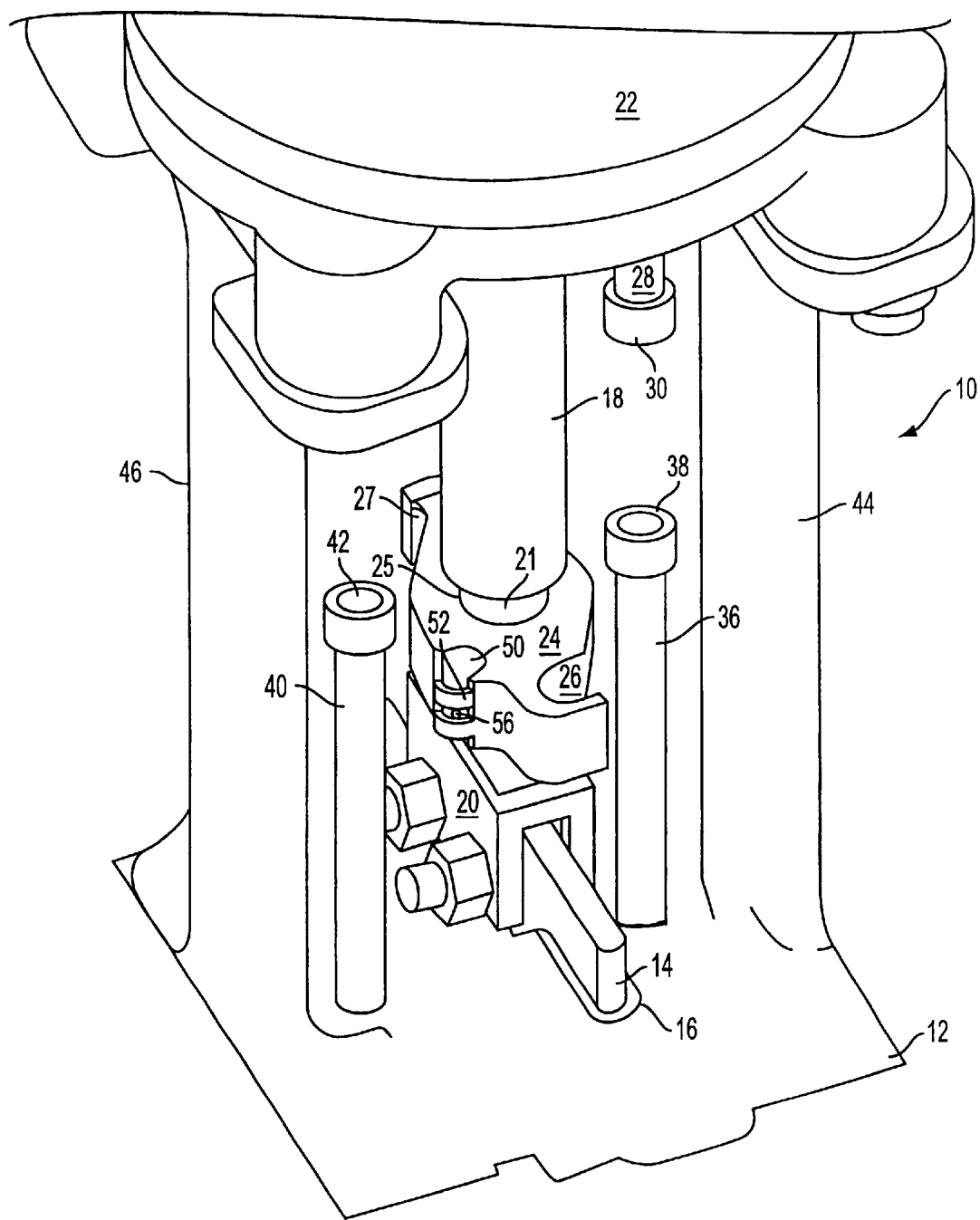
FIG. 1 is a perspective view of a valve unlocked in a lowered, closed position.

Referring now to the figures, wherein like reference numerals indicate like elements, in FIG. 1 there is shown a valve 10 having a housing 12. A knife 14 slides through opening 16 in the housing 12. Reciprocation of the knife 14 in a gate of the valve 10 opens and closes the fluid path in the valve 10. The movement of the knife 14 is described herein for convenience as being vertical, with raised and lowered positions. However, the valve 10 may of course be oriented in any direction, and the knife 14 may actually reciprocate horizontally or in any angled direction relative to the ground.

The knife 14 is moved vertically by a shaft 18, and is attached to the shaft 18 by a clamp 20. The clamp 20 has a shaft portion 21 that is attached to the lower end of the shaft 18. The shaft 18 is moved vertically by a cylinder actuator 22 which may be hydraulic, pneumatic, electrical or powered by any suitable means. A swivel lock 24 is attached to the clamp 20 adjacent to the end of the shaft 18. The swivel lock 24 has an internal bore with a bearing 25 sized to fit on an outer surface of the shaft portion 21 of the clamp 20, so that the swivel lock 24 can freely rotate around the axis of the shaft portion 21, but is restrained so that it cannot travel upwardly or downwardly along the shaft portion 21 in the direction of the axis of the shaft 18. The swivel lock 24 can alternatively be mounted to the shaft 18 so that the swivel lock 24 swivels around the shaft 18 but does not move axially along the shaft 18. The swivel lock has indentations 26, 27 that can engage posts 28, 32, 36 and 40 as described below.

An upper post 28 extends downwardly from the cylinder actuator 22 and has a head 30. A second upper post 32 extends downwardly from the cylinder actuator 22 and has a head 34. A lower post 36 extends upwardly from the housing 12 and has a head 38. A second lower post 40 extends upwardly from the housing 12 and has a head 42. Side supports 44 and 46 connect the housing 12 and the cylinder actuator 22. The heads 30, 34, 38 and 42 form a change in diameter of the posts, and together with the adjacent regions of the posts the heads form an engageable portion that can be engaged in the indentations 26 and 27 of the swivel lock 24.

Figure 2:
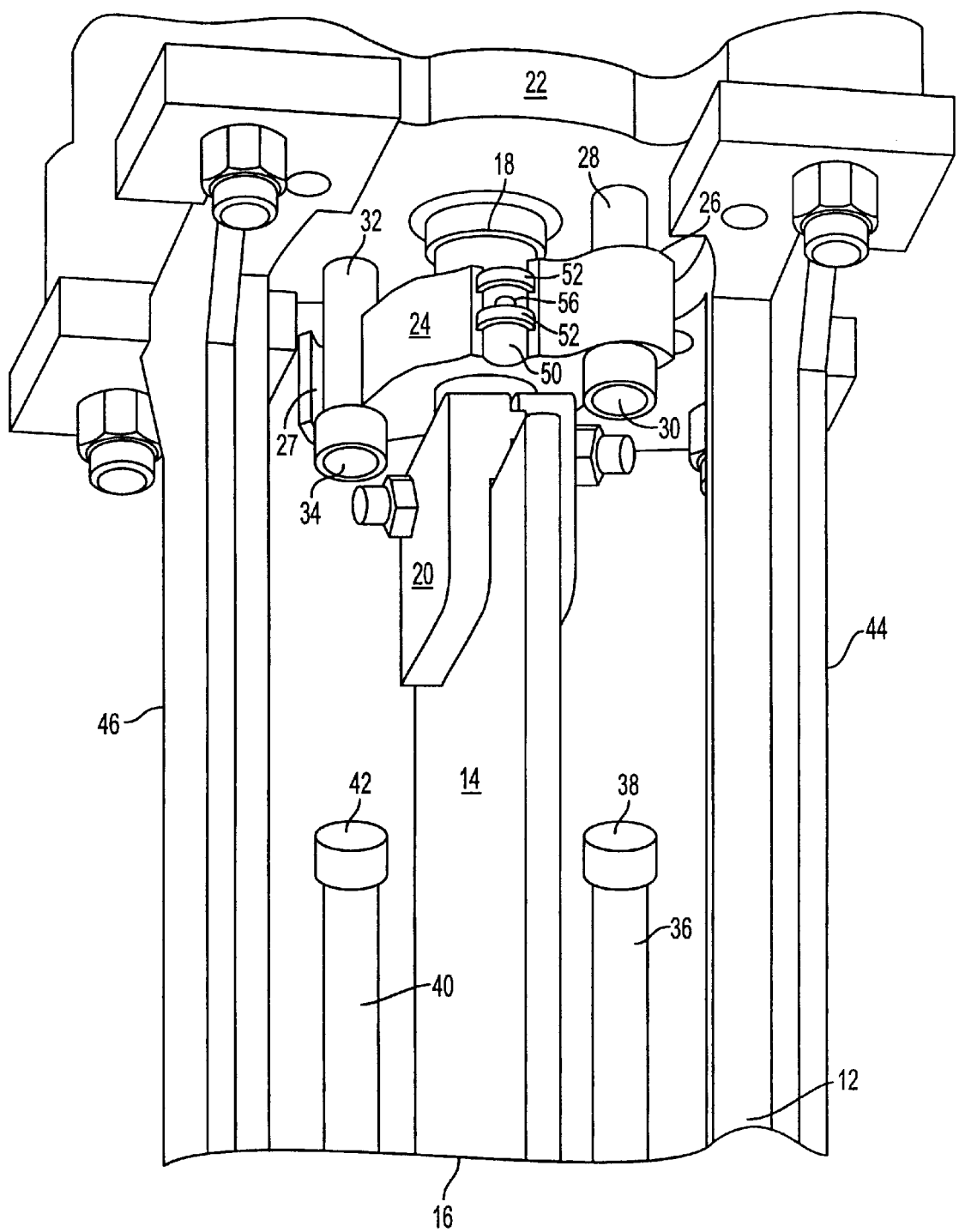
FIG. 2 is a perspective view of a valve locked in a raised, open position.

FIG. 2 shows the valve 10 in an upright and locked position with the knife 14 extending from the opening 16 of the housing 12, and attached to the shaft 18 by the clamp 20. The shaft 18 in this position is retracted due to force exerted by the cylinder actuator 22 to open the valve. The swivel lock 24 adjacent the clamp 20 is engaged with and in contact with the upper posts 28, 32. In the embodiment shown, the indentation 27 fits partially around the diameter of post 32, and has a smaller diameter than head 34, so that the swivel lock 20 cannot move axially past the head 30.

The swivel lock 24 has a vertical slot 50 with webbing 52. The swivel lock 24 has a hole 56 perpendicular to the axis of rotation of the swivel lock 24 at the vertical slot 50 in which a set screw 54 (see FIG. 7) may be inserted to prevent the swivel lock 24 from rotating from the position it is in when the set screw 54 is installed. The set screw 54 can also be used to hold the swivel lock 24 in the unlocked position shown in FIG. 1. The shaft 18 may have a dimple or indentation to receive the set screw 54 when the swivel lock 24 is rotated to a certain position. Alternatively, the set screw 54 may engage the cylindrical surface of the shaft 18 and frictionally engage it with sufficient force to prevent rotation of the swivel lock 24 until the set screw 54 is released. In the preferred embodiment, the set screw need not be removed once installed; it can be backed off to permit rotation of the swivel member and can be tightened to hold the swivel member in the locked or unlocked position.

Once the set screw 54 has been tightened to hold the swivel lock 24 against rotation, an obstructing member 70 (see FIG. 7) may be inserted through the slot 50 to obstruct access to the head of the set screw 54, so that the set screw 54 cannot be loosened until the obstructing member 70 is removed. In the preferred embodiment shown, the obstructing member 70 is a padlock, although in some instances it may be desirable to use other locks, pins or other obstructing devices. For example, a safety lockout hasp may be used, which is a hasp to which several padlocks can be separately attached and detached, so that different users can place and remove individual padlocks and all padlocks must be removed to remove the hasp.

Figure 3:
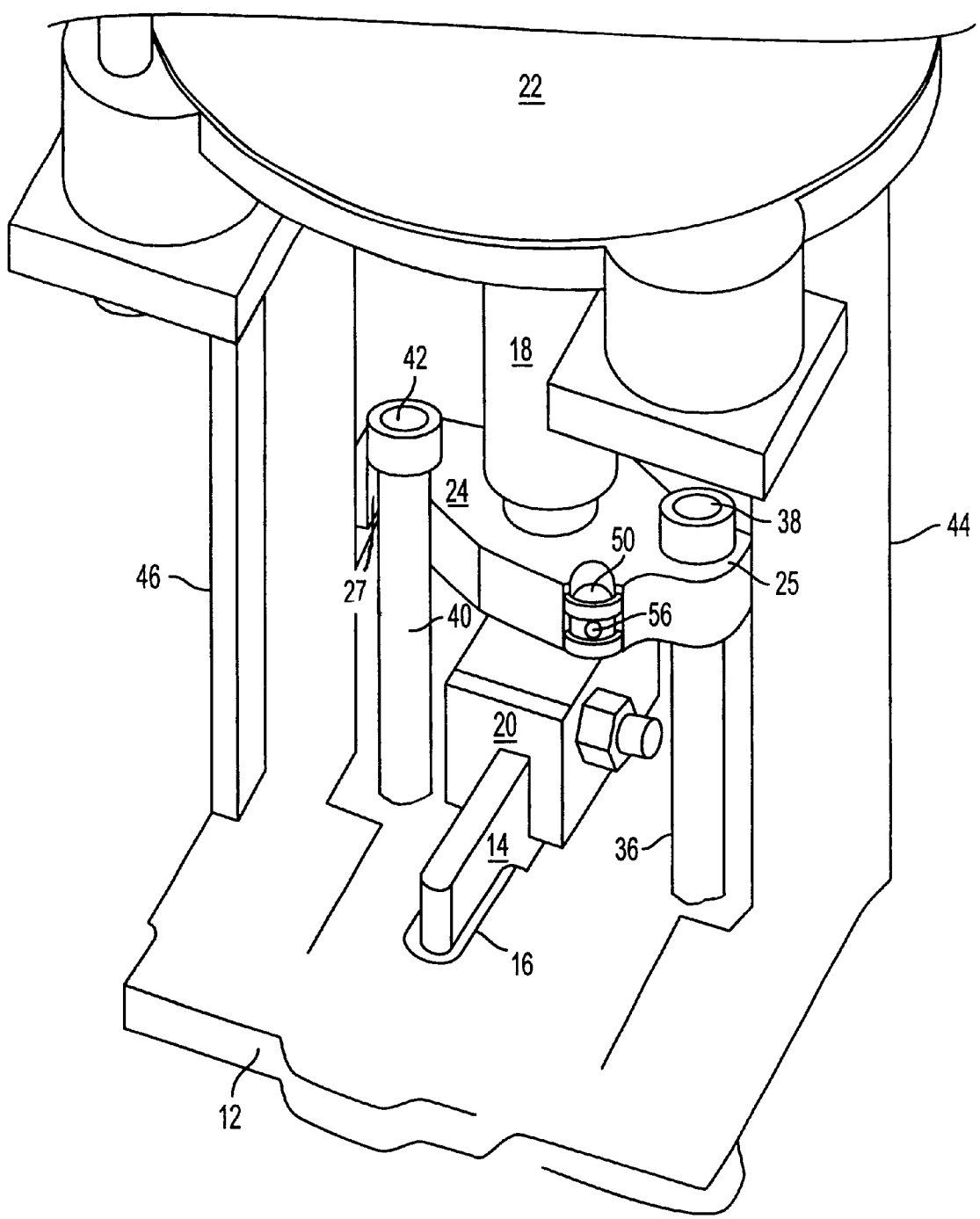
FIG. 3 is a perspective view of a valve locked in a lowered, closed position.

FIG. 3 shows the valve 10 in a lowered and locked position with the knife 14 inserted into the opening 16 of the housing 12. The shaft 18 in this position is extended downward due to force exerted by the cylinder actuator 22 to close the valve. The swivel lock 24 is engaged and in contact with the lower posts 36, 40. In the embodiment shown, the indentation 27 fits partially around the diameter of post 40, and has a smaller diameter than head 42, so that the swivel lock 20 cannot move axially past the head 42. Of course other ways of the swivel lock 24 engaging the posts are possible. For example, the posts may have one or more areas with a reduced diameter that can be engaged by the indentations 26, 27 of the swivel lock 24. Alternatively the swivel lock 24 may have projections that engage slots or holes in the posts. Although pairs of upper and lower posts are described, a pair of single rods spanning from the housing 12 to the actuator 22 can also be used. Alternatively, the swivel member 24 could engage with any structure besides posts, such as one or more beams or plates with indentations or projections, or any other structure that engages with the swivel lock when rotated to a certain position. Rotating the swivel lock in one direction causes it to engage the posts to prevent vertical movement of the knife (i.e., locks the knife). Rotating the swivel lock in the other direction causes the swivel lock 24 to disengage from the posts to permit vertical movement of the knife (i.e., unlocks the knife). The swivel lock 24 is rotatable manually. Alternatively the swivel lock 24 may be power operated and/or rotated via remote control.

In the examples shown the valve open locking position of the swivel lock and the valve closed locking position of the swivel lock are at the same rotational position about the axis and are at different axial locations along the axis. However, if the posts are positioned differently, the swivel lock may have a valve open locking position that is rotationally different than the valve open locking position.

Figure 4:
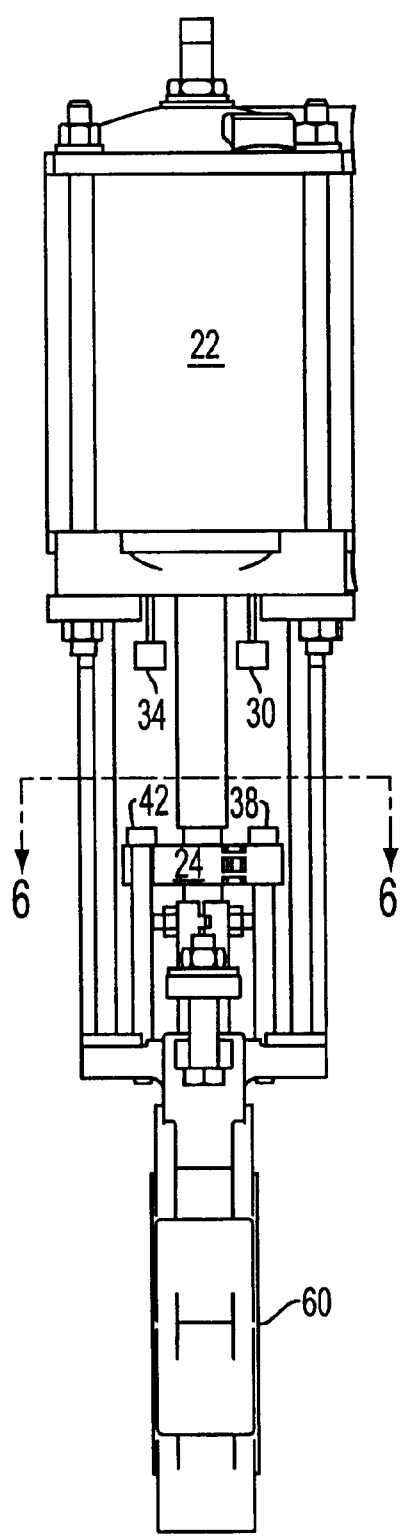
FIG. 4 is a side view of a valve and cylinder actuator, with the valve locked in a lowered, closed position.

FIG. 4 shows a perspective view of the valve 10 in combination with the valve apparatus 60 of the valve 10. The valve 10 is in the lowered, locked position.

Figure 5:
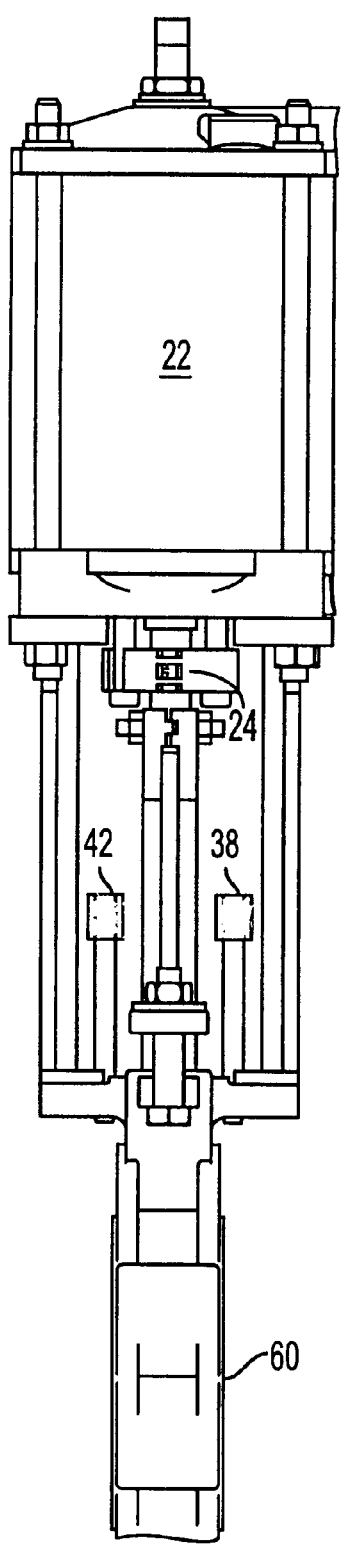
FIG. 5 is a side view of a valve and cylinder actuator, with the valve locked in a raised, open position.

FIG. 5 shows a perspective view of the valve 10 in the upright and locked position. The vertical slot 50 is pictured without the set screw 54 inserted.

Figure 6:
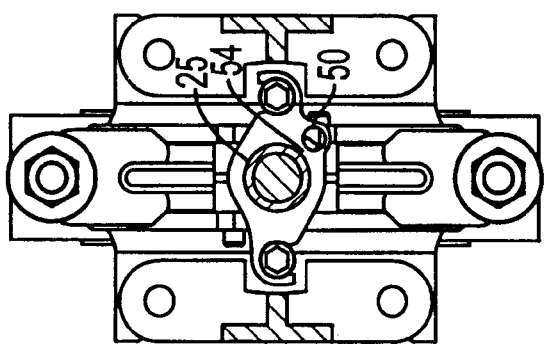
FIG. 6 is a cross sectional view taken along line 6—6 in FIG. 4.

FIG. 6 shows a cross sectional view of the valve 10 taken along line 6—6 in FIG. 4. The valve 10 is in the lowered and locked position. The swivel lock 24 is engaged and in contact with the lower posts 36, 40.

Figure 7:
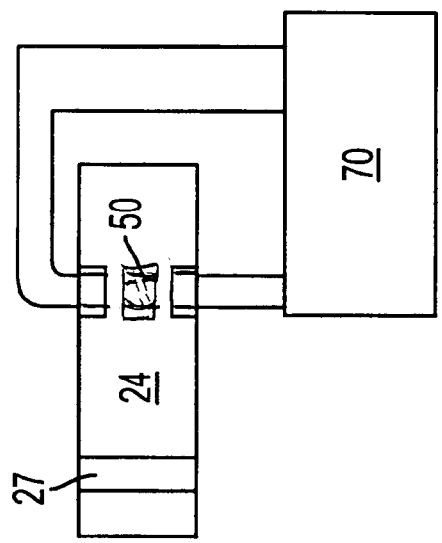
FIG. 7 is a side detail view of a swivel lock with a padlock installed.

FIG. 7 shows the swivel lock 24 with a an obstructing member 70 in the form of a padlock inserted through the vertical slot.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A locking device for a knife gate valve having a housing and a reciprocating shaft that reciprocates a knife in back and forth directions, the locking device comprising:
   a pair of first posts disposed substantially parallel to the shaft, each first post having one end mounted to the housing, and each first post having a first engageable portion; and
   a swivel lock member mounted to rotate substantially about the axis of the shaft and to reciprocate together with the shaft and the knife, said swivel lock member selectively rotatable between (1) an unlocked position at which said swivel lock member does not engage said first engageable portions and (2) a locked position at which said swivel lock member engages both of said first engageable portions to prevent said swivel lock member from movement in at least one of the back and forth directions along the axis of said shaft, thereby preventing said shaft and said knife from reciprocating movement in at least one of the back and forth directions when said swivel lock member is in the locked position and engaging said first engageable portions.

2. A locking device according to claim 1, wherein said swivel lock member has a pair of indentations each adapted to engage one of said first engageable portions.

3. A locking device according to claim 1, wherein said first engageable portions include a head having a first diameter greater than a second diameter of an adjacent portion of said first posts.

4. A locking device according to claim 3, wherein said swivel lock member has a pair of indentations that each have a width less than the first diameter and at least as great as the second diameter to engage said post with movement in at least one of the back and forth directions blocked by a respective head.

5. A locking device according to claim 1, wherein said first engageable portions include a portion of said first posts at which said respective post changes diameter.

6. A locking device according to claim 1, further comprising:
   a pair of second posts disposed substantially parallel to the shaft, each second post having one end mounted to the housing, and each second post having a second engageable portion, wherein said swivel lock is rotatable to a second locked position at which said engaging portions each engage one of said second engageable portions to prevent said swivel lock member from movement in at least one of the back and forth directions along the axis of said shaft, thereby preventing said shaft and said knife from reciprocating movement in one of the back and forth directions when said swivel lock is in the locked position and engaging said second engageable portions.

7. A locking device according to claim 6, wherein the first locking position and the second locking position are at the same rotational position about the axis and are at different axial locations along the axis.

8. A locking device according to claim 6, wherein said indentations are each adapted to engage one of said second engageable portions.

9. A locking device according to claim 6, wherein said second engageable portions include a head having a third diameter greater than a fourth diameter of an adjacent portion of said second posts.

10. A locking device according to claim 9, wherein said indentations each have a width less than the third diameter and at least as great as the fourth diameter to engage said post with movement in at least one of the back and forth directions blocked by a respective head.

11. A locking device according to claim 6, wherein said second engageable portions include a portion of said second posts at which said respective post changes diameter.

12. A method for locking a knife gate valve having a housing and a reciprocating shaft that reciprocates a knife in back and forth directions and has a pair of first posts disposed substantially parallel to the shaft, each first post having one end mounted to the housing, and each first post having a first engageable portion comprising the steps of:
   positioning the knife in a desired position; and
   rotating a swivel lock member mounted to rotate substantially about the axis of the shaft and to reciprocate together with the shaft and the knife into a locked position at which the swivel lock member engages both of the first engageable portions to prevent the swivel lock member from movement in at least one of the back and forth directions along the axis of the shaft, thereby preventing the shaft and the knife from reciprocating movement in at least one of the back and forth directions when the swivel lock member is in the locked position and engaging the first engageable portions.

13. The method according to claim 12, wherein the step of rotating the swivel lock into the locked position is performed manually.

14. The method according to claim 12, further comprising the step of rotating the swivel lock member to an unlocked position at which the swivel lock does not engage the engageable portions.

15. The method according to claim 12, further comprising the step of tightening a set screw to prevent the swivel lock member from rotating about the axis of the shaft.

16. The method according to claim 15, further comprising the step of inserting an obstructing member through a slot in the swivel lock member to obstruct access to a head of the set screw.

17. A method according to claim 16, wherein the obstructing member comprises a padlock.

18. A locking device for a knife gate valve having a housing and a reciprocating shaft that reciprocates a knife in back and forth directions, the locking device comprising:
   a pair of first posts disposed substantially parallel to the shaft, each first post having one end mounted to the housing, and each first post having a first engageable portion; and
   rotating locking means mounted to rotate substantially about the axis of the shaft and to reciprocate together with the shaft and the knife, said rotating locking means selectively rotatable between (1) an unlocked position at which said lock means does not engage said first engageable portions and (2) a locked position at which said lock means engages both of said first engageable portions to prevent said swivel lock member from movement in at least one of the back and forth directions along the axis of said shaft, thereby preventing said shaft and said knife from reciprocating movement in at least one of the back and forth directions when said locking means is in the locked position and engaging said first engageable portions.

19. A locking device according to claim 18, wherein said locking means has a pair of indentations each adapted to engage one of said first engageable portions.

20. A locking device according to claim 18, wherein said first engageable portions include a head having a first diameter greater than a second diameter of an adjacent portion of said first posts.

* * * * *